United States Patent [19]

Johnson

[11] Patent Number: 5,275,514
[45] Date of Patent: Jan. 4, 1994

[54] DRILL SUPPORT

[75] Inventor: Mark Johnson, Sheffield, United Kingdom

[73] Assignees: Eclipse Magnetics Ltd.; Universal Drilling and Cutting Equipment Limited, both of Sheffield, England

[21] Appl. No.: 988,175

[22] Filed: Dec. 9, 1992

[30] Foreign Application Priority Data

Jan. 29, 1992 [GB] United Kingdom ............... 9201862

[51] Int. Cl.⁵ .................................... B23B 45/14
[52] U.S. Cl. ............................. 408/76; 408/710
[58] Field of Search .................. 279/128; 408/76, 710

[56] References Cited

U.S. PATENT DOCUMENTS

Re. 33,145  1/1990  Palm .

FOREIGN PATENT DOCUMENTS 0109011  5/1984  European Pat. Off. .
0254939  2/1988  European Pat. Off. .
3201826  9/1983  Fed. Rep. of Germany ...... 279/128
149130   9/1982  Japan ................................. 279/128
221238  11/1985  Japan ................................. 279/128
1469463  9/1974  United Kingdom .
1520758 10/1975  United Kingdom .
1545566 11/1976  United Kingdom .
2038560  7/1980  United Kingdom .
2173427 10/1986  United Kingdom .

Primary Examiner—Daniel W. Howell
Attorney, Agent, or Firm—Herbert Dubno

[57] ABSTRACT

A portable workpiece-mounted machine tool such as a drill is provided with a permanent-electromagnet attaching unit which has its reversible permanent magnets alternating with nonreversible permanent magnets so that, when electric current is applied to the reversible magnets, they are subjected to polarity reversal which causes flux closure through a workpiece of the reversible and nonreversible magnets in the "on" position and causes flux closure between a reversible and nonreversible magnet in an "off" position.

10 Claims, 3 Drawing Sheets

DRILL SUPPORT

FIELD OF THE INVENTION

This invention relates to a drill support. More particularly the invention relates to a support for portable drills of the type commonly used on construction sites, shipyards etc. for machining of structural elements such as rolled steel joists, boiler plates etc.

BACKGROUND OF THE INVENTION

Drill supports or drill stands of this type are well known and consist of a support which is secured to the workpiece so that the drill can be secured and positioned on the stand to effect accurate drilling or machining of the workpiece.

Hitherto drill supports of this type comprised an electromagnet which was used to secure the support to the workpiece. Such electromagnets rely on an electric current which is turned on to secure the support in position and off to enable movement of the support to the correct position. The electric current has to be maintained to secure the support to the workpiece. If the electric current is interrupted either by accident or by a power failure the support will be no longer secured to the workpiece. This can be very dangerous when it occurs during machining of the workpiece. Current interruption is especially dangerous when the workpiece is vertical or must be machined from below. In such cases chains are sometimes provided to prevent the drill from falling in the event of a power failure. However sometimes the chains are not attached due to forgetfulness or inconvenience and the consequences in the event of power failure are very dangerous particularly if the workpiece is located high above the ground as would be the case during construction of a tall building.

The drill support of the present invention avoids all these safety problems of existing drill supports by using a permanent electro magnet instead of conventional electromagnets. Such permanent-electro magnets do not require a continuous electric current to secure the support to the workpiece because the holding power is provided by the permanent magnets. An electrical power failure will not result in any loss of magnetic holding power. The permanent-electro magnet uses an electrical current merely to switch the magnet on and off.

OBJECTS OF THE INVENTION

It is an object of this invention to provide a drill support which does not get hot after prolonged use so there is no risk of impairing the performance of the magnet.

It is a further object of this invention to provide a drill support with a magnet having a holding power which is not affected by high consumption of current from the drill.

SUMMARY OF THE INVENTION

According to the present invention there is provided a portable drill support comprising a frame which comprises a drill or other machine tool and means to secure the drill support to a workpiece which means comprises a permanent-electro magnet which can be switched selectively to an on position where the magnetic flux passes through the workpiece holding it securely in position and to an off position where the magnetic flux does not pass through the workpiece so the workpiece is released.

BRIEF DESCRIPTION OF THE DRAWING

The above and other objects, features and advantages of the invention will become more readily apparent from the following description, reference being made to the accompanying highly diagrammatic drawing in which.

SPECIFIC DESCRIPTION

Figure 1:
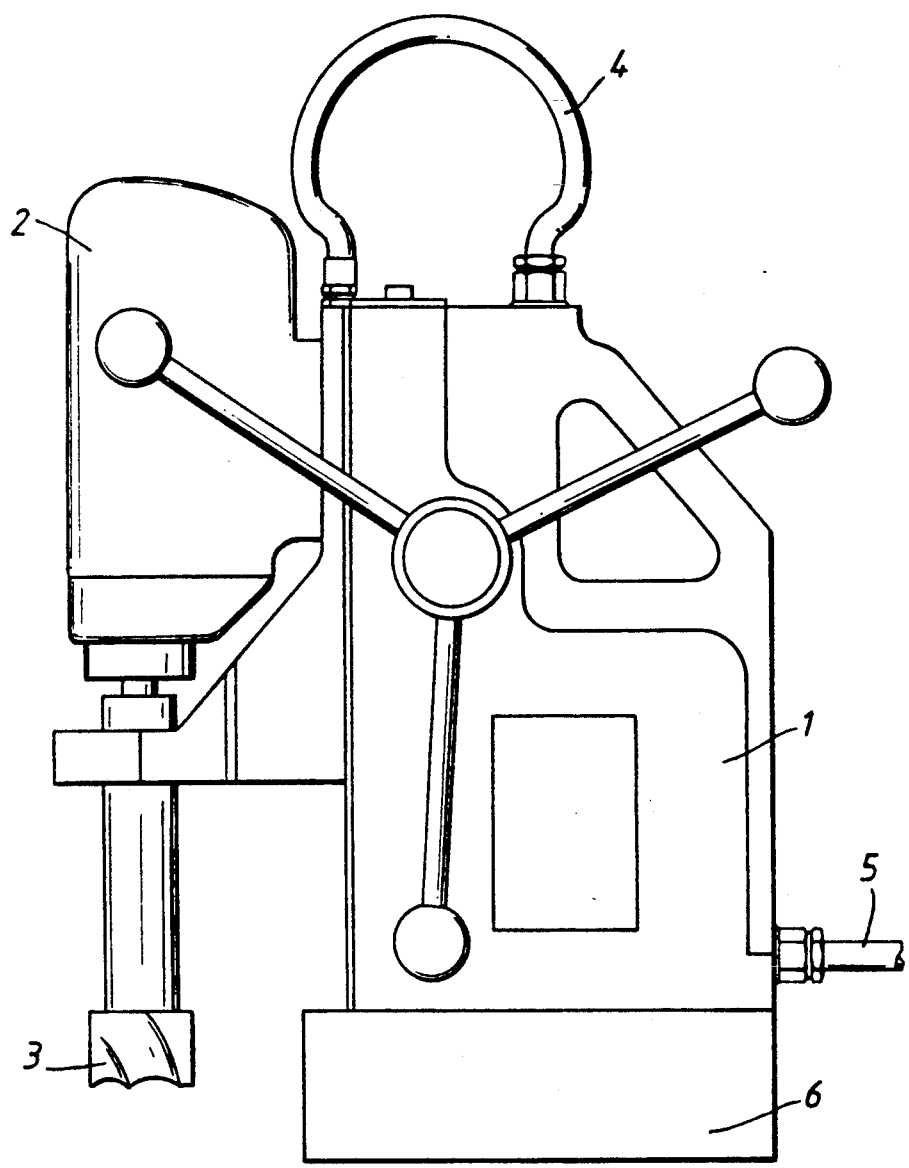
FIG. 1 is a side elevation of the general arrangement of a drill stand and drill.

As has been shown in FIG. 1 a drill support 1 of the invention is connected to a drill 2 ready for use on site. The drill support has connected to its base a permanent-electro magnet unit (or PE unit) 6. The PE unit 6 can be turned on and off as required to fix the drill support in the correct place on a workpiece (not shown). The construction of the PE unit 6 is described in greater detail below. A power supply cable 5 is attached to the drill support and is used to power the drill 2 comprising a cutting tool 3 via a further cable 4 and to control the PE unit 6. Once the PE unit 6 has been switched either to the on or off position the electrical supply is isolated from the PE unit 6 and is only used to supply the drill 2. Thus the PE unit 6 will remain magnetized and not become detached from the work piece in the event of a power failure. The PE unit 6 will not become hot after prolonged use because of the absence of supply of a continuous current and the holding power of the base will not be affected by high consumption of current by the drill.

The drill support comprises various safety interlocks in the electrical supply circuit as follows:

1) The drill can not be switched on until the base has been magnetized.

2) If the base is demagnetized for any reason while the drill is still running then the drill will automatically switch off.

3) If power fails and is later restored the drill will not come back on.

Figure 2:
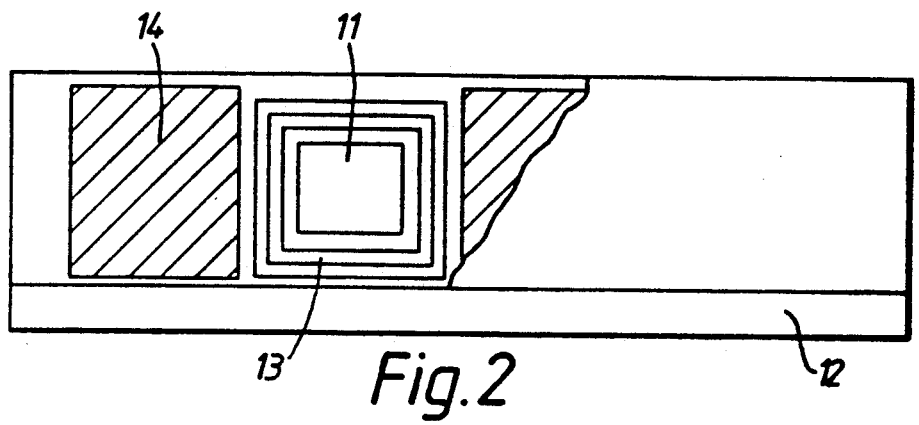
FIG. 2 is a side elevation of the permanent-electro magnet showing the arrangement of the magnets.
Figure 3:
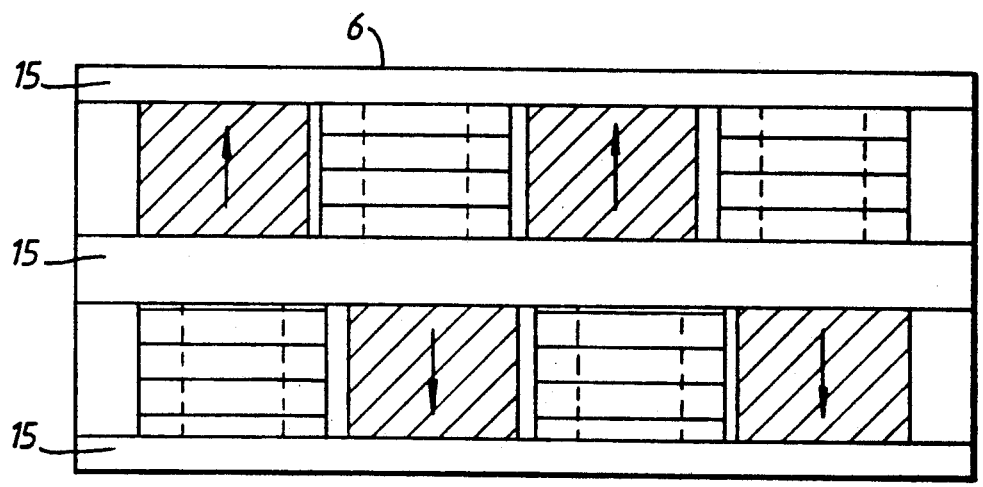
FIG. 3 is a bottom view of the permanent-electro magnet with the top plate removed.
Figure 4:
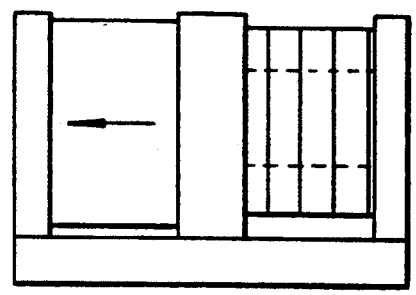
FIG. 4 is an end view of the permanent-electro magnet.

As shown in FIGS. 2 to 4, the PE unit 6 comprises a combination of reversible permanent magnets 11 and nonreversible permanent magnets 14 arranged in an alternating checkered array. The checkered arrangement is purely a matter of design choice and the invention can be achieved with any one of a large number of different arrangements of the reversible and non-reversible permanent magnets. The reversible permanent magnets 11 consist of any suitable material such as ALCOMAX. Each row of magnets is separated by mild steel pole pieces 15 and the whole arrangement is covered by a top plate 12 preferably made from a non magnetic material such as aluminium. The reversible permanent magnets 11 are provided with coils 13 which allow the polarity to be reversed when a pulse of current is passed through the coil 13.

Figure 5B:
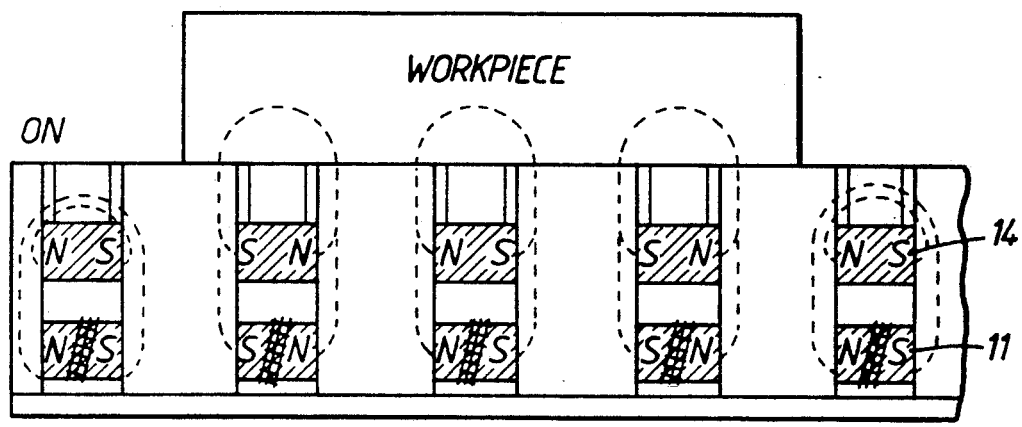
FIGS. 5A and 5B are schematic views of the permanent-electro magnet with different arrangements of magnets to show the flux in the on and off positions.
Figure 5A:
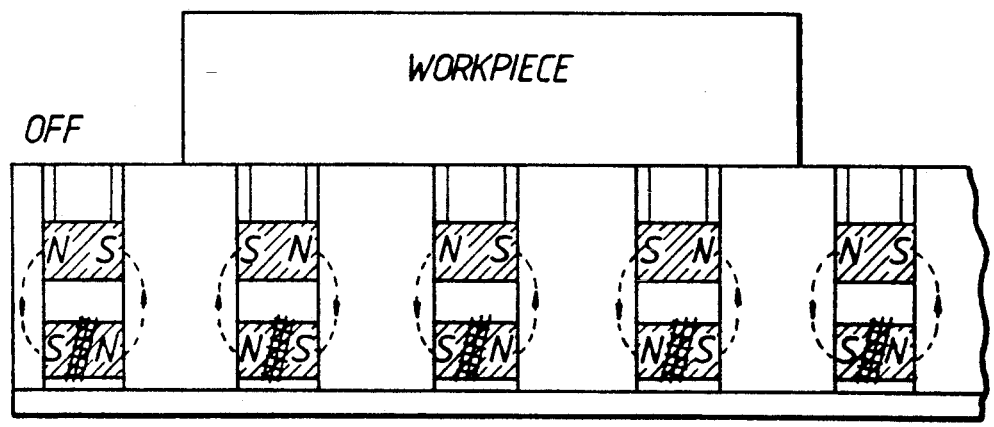

The arrangement of magnets of the unit in FIGS. 5A and 5B is different from that in FIGS. 2 to 4 and FIGS. 5A and 5B show more clearly how by changing the respective polarities of the reversible permanent magnets in the PE unit 6 causes the magnetic field to change. In the on position (FIG. 5B) the upper row of non-reversible permanent magnets are magnetized in the same direction as the lower row of reversible permanent magnets 11. The easiest path for the magnetic flux to take is through the workpiece which holds the workpiece securely in position on the surface of the magnet.

To switch the device off a pulse of current is passed through the coils 13 surrounding the reversible magnets 11 which remagnetizes the ALCOMAX in the opposite direction.

The upper row of non reversible permanent magnets 14 is now magnetized in the opposite direction to the reversible magnets 11 in the lower row (FIG. 5A). The magnetic flux now forms a closed loop within in the PE unit 6 and the workpiece is released.

I claim:

1. A support for a portable machine tool, such as a drill for use in the construction of a steel framework for a building, which comprises an attaching means for attaching the machine tool to a workpiece, such as part of the steel framework, said attaching means comprising a permanent-electro magnet unit which includes at least one nonreversible magnetic core and at least one reversible magnetic core, said reversible and nonreversible magnetic cores being arranged proximate to one another to contribute magnetic fluxes to the same paths such that the permanent-electro magnet unit can be switched to an "on" state in which the magnetic flux passes through the workpiece holding the machine tool securely in position and an "off" state whereby the machine tool is released.

2. A support for a machine tool according to claim 1 wherein that the attaching means is fixed to the base of the support for the machine tool.

3. A support for a machine tool according to claim 1 wherein said at least one of said reversible magnet cores is surrounded by a coil.

4. A support for a machine tool according to claim 1 wherein the permanent-electro magnet unit comprises at least one row of alternating reversible and non-reversible magnetic cores.

5. A support for a machine tool according to claim 1 wherein mild steel pole pieces are dispersed between the reversible and non-reversible cores.

6. A support for a machine tool according to claim 1 wherein the attaching means only is provided with electrical circuit means connected to said unit for requiring current when changing the state of the permanent-electro magnet.

7. A support for a machine tool according to claim 1 wherein said attaching means is provided with means whereby failure of supply of electrical power to the permanent-electro magnet unit while the permanent-electro magnet unit is in the "on" state the magnetic flux will continue to pass through the workpiece holding the machine tool securely in position.

8. A support for a machine tool according to claim 1, further comprising circuit means preventing the machine tool from being switched on until the permanent magnet unit has been switched on.

9. A support for a machine tool according to claim 1 wherein said attaching means is constructed so that if the magnetic field of the permanent-electro magnet unit is accidentally switched to the "off" position, while the machine tool is still running, the machine tool will automatically be switched off.

10. A support for a machine tool according to claim 1 wherein said attaching means is constructed so that if the power to the support fails and is restored later on, the machine tool will not start again automatically but will have to be switched on again.

* * * * *